(12) United States Patent
Zhang et al.

(10) Patent No.: US 9,988,038 B2
(45) Date of Patent: Jun. 5, 2018

(54) METHODS AND SYSTEM FOR CONTROLLING TORQUE FLOW THROUGH A TORQUE CONVERTER

(71) Applicant: Ford Global Technologies, LLC, Dearborn, MI (US)

(72) Inventors: Chen Zhang, Westland, MI (US); Rajit Johri, Canton, MI (US); Xiaoyong Wang, Novi, MI (US); Ming Lang Kuang, Canton, MI (US); Jeffrey Allen Doering, Canton, MI (US); Felix Nedorezov, Rochester Hills, MI (US); Alexander O'Connor Gibson, Ann Arbor, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 14/682,362

(22) Filed: Apr. 9, 2015

(65) Prior Publication Data
US 2016/0297419 A1    Oct. 13, 2016

(51) Int. Cl.
| B60W 10/08 | (2006.01) |
| F16H 61/48 | (2006.01) |
| B60W 10/02 | (2006.01) |
| B60W 20/19 | (2016.01) |
| F16H 59/36 | (2006.01) |
| F16H 61/14 | (2006.01) |

(52) U.S. Cl.
CPC .......... *B60W 10/08* (2013.01); *B60W 10/026* (2013.01); *B60W 20/19* (2016.01); *F16H 61/143* (2013.01); *F16H 61/48* (2013.01); *F16H 2059/366* (2013.01); *F16H 2061/145* (2013.01); *F16H 2312/02* (2013.01); *Y10S 903/93* (2013.01)

(58) Field of Classification Search
CPC ........ F16H 61/143; F16H 61/14; F16H 59/18; B60W 10/026; B60W 20/19; B60W 30/18027
See application file for complete search history.

(56) References Cited

U.S. PATENT DOCUMENTS

| 6,616,569 | B2 | 9/2003 | Hoang et al. | |
| 8,758,200 | B2 | 6/2014 | Dai et al. | |
| 2007/0243971 | A1* | 10/2007 | Brevick | F16H 61/143 477/70 |
| 2008/0196954 | A1* | 8/2008 | Soliman | B60K 6/48 180/65.25 |
| 2011/0160020 | A1* | 6/2011 | Lee | F16H 61/143 477/168 |
| 2015/0066264 | A1 | 3/2015 | Wang et al. | |
| 2015/0134215 | A1* | 5/2015 | Kawaguchi | F16H 61/143 701/67 |

OTHER PUBLICATIONS

Zhang, C. et al. "Methods and System for Launching a Vehicle," U.S. Appl. No. 14/682,319, filed Apr. 9, 2015, 62 pages.

* cited by examiner

*Primary Examiner* — Stacey Fluhart
(74) *Attorney, Agent, or Firm* — David Kelley; McCoy Russell LLP

(57) ABSTRACT

Systems and methods for operating a hybrid vehicle driveline that includes an engine and a motor are presented. In one example, the systems and methods include one or more control modes where engine and/or motor speed or torque is adjusted responsive to different control parameters during a vehicle launch from zero speed or a creep speed.

7 Claims, 13 Drawing Sheets

METHODS AND SYSTEM FOR CONTROLLING TORQUE FLOW THROUGH A TORQUE CONVERTER

FIELD

The present description relates to methods and a system for controlling torque flow through a torque converter during vehicle launch from a stop or creep. The methods and systems may be particularly useful for hybrid vehicles that include a motor and a torque converter having a lockup clutch.

BACKGROUND AND SUMMARY

A driveline of a vehicle may include a torque converter that provides torque multiplication and driveline dampening. The torque multiplication can improve vehicle acceleration from zero speed, but the torque multiplication is a result of operating an engine or motor at a higher speed to create slip across the torque converter. The engine, motor, and torque converter may operate less efficiently when there is a large amount of slip across the torque converter (e.g., a large speed differential between a torque converter impeller and torque converter turbine). Consequently, powertrain efficiency may be reduced more than is desired during vehicle launch. Nevertheless, it may be desirable for the torque converter to operate with a large amount of slip between the torque converter impeller and the torque converter turbine when a driver is requesting a large amount of torque so that the vehicle may accelerate more rapidly.

The inventors herein have recognized the above-mentioned issue and have developed a driveline operating method, comprising: accelerating a torque converter impeller to a desired speed responsive to release of a brake pedal during a vehicle launch; providing hydraulic and friction torque paths through a torque converter in response to driver demand less than a threshold during the vehicle launch; and providing only a hydraulic torque path through the torque converter in response to driver demand greater than the threshold during the vehicle launch.

By selectively providing different torque paths through a torque converter during vehicle launch, it may be possible to provide the technical result of improved torque converter and driveline efficiency. In particular, driver demand may be a basis for deciding whether torque is passed through a torque converter during vehicle launch via only a hydraulic torque path or via hydraulic and friction torque paths. The hydraulic and friction torque paths may be provided for lower driver demand conditions while only the hydraulic torque path is provide during higher driver demand conditions.

Additionally, compensation may be provided for torque converter lockup clutch delay periods so that driveline torque response may be improved. For example, torque converter impeller speed or torque may be adjusted during the torque converter lockup clutch delay period to temporarily increase torque flow through the torque converter hydraulic torque path so as to improve the amount of torque transferred to a transmission and vehicle wheels.

The present description may provide several advantages. For example, the approach may provide more consistent vehicle launches under similar operating conditions. Additionally, the approach may improve driveline efficiency while at the same time providing the capacity to accelerate at a higher rate when requested by driver demand. Further, the approach compensates for delays in torque converter clutch lockup operation so that a driver may experience a more acceptable rate of vehicle acceleration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
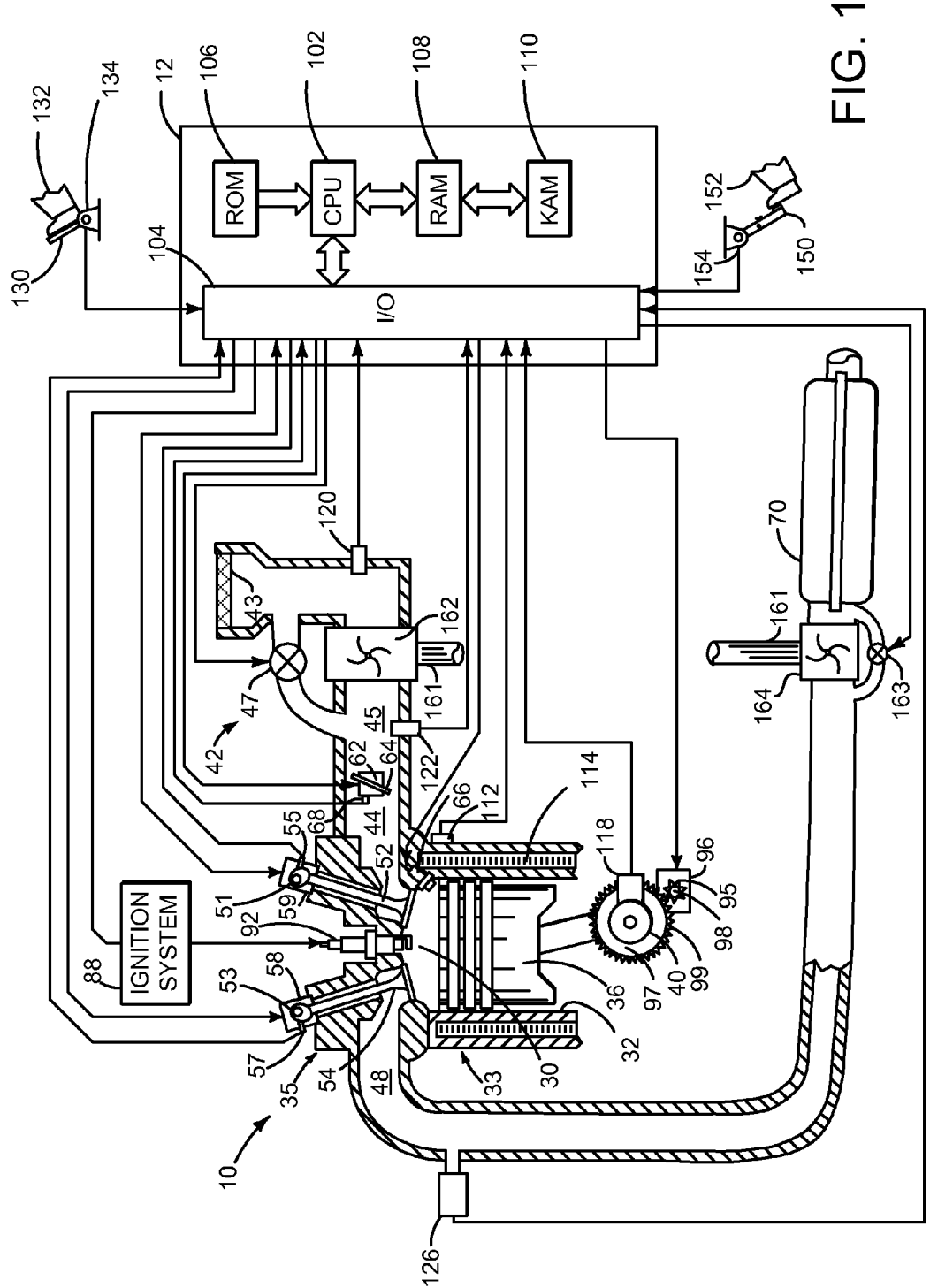
FIG. 1 is a schematic diagram of an engine.
Figure 2:
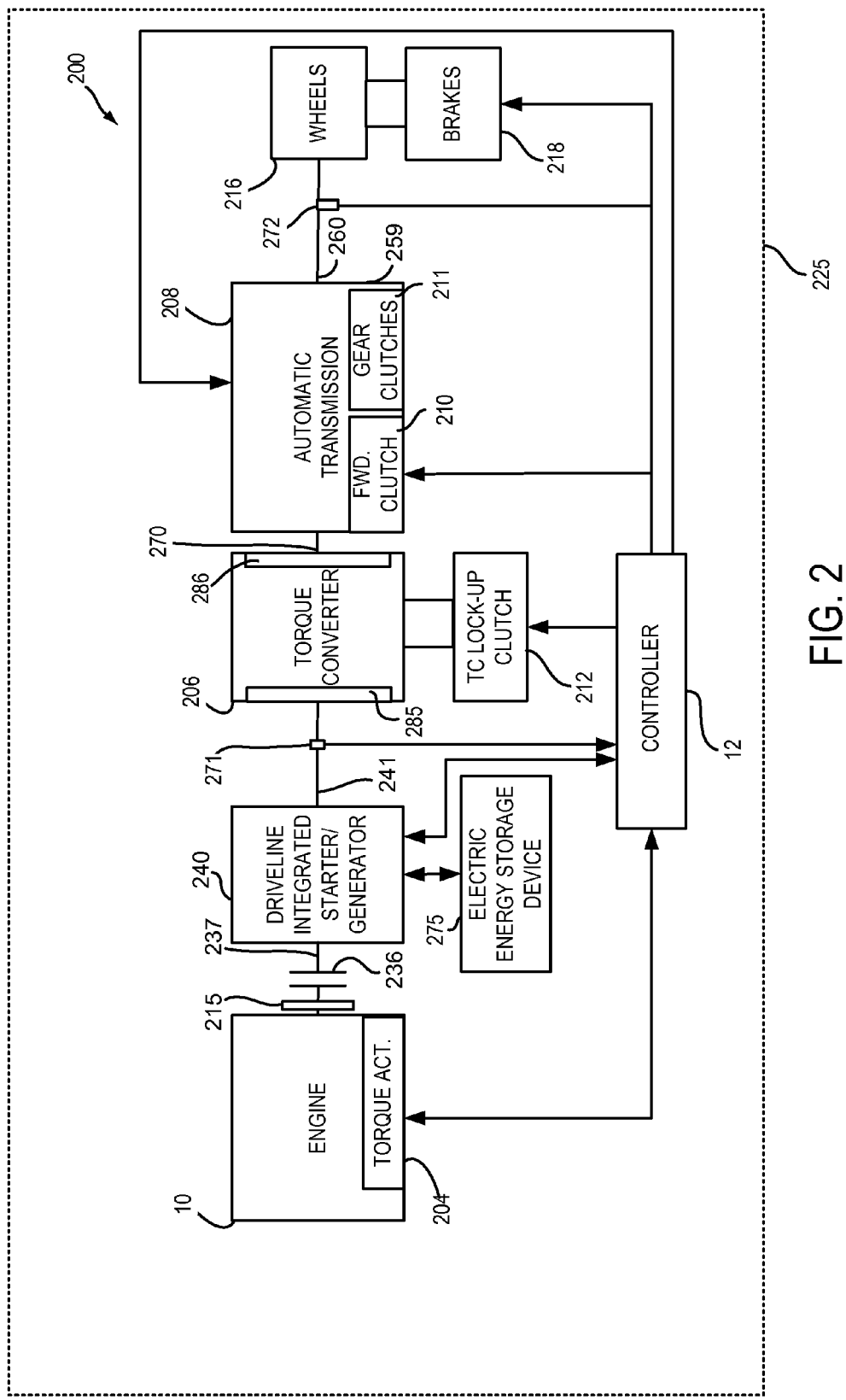
FIG. 2 is a schematic diagram of a hybrid vehicle driveline.
Figure 3:
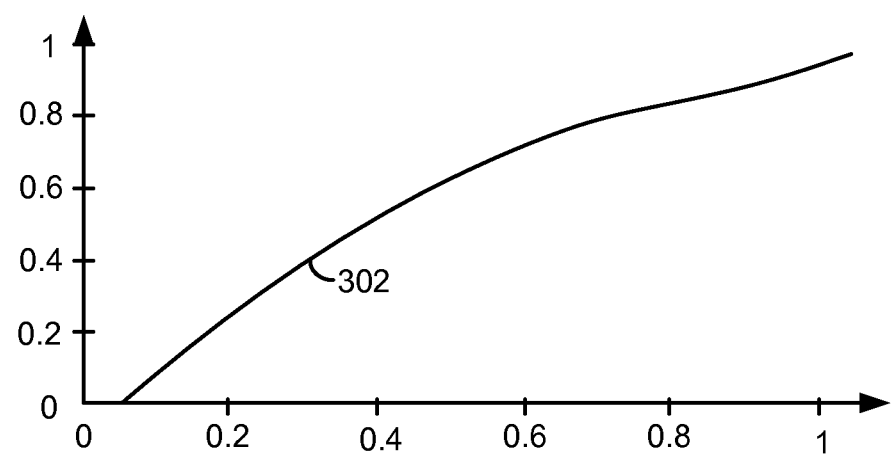
FIG. 3 is an example plot of torque converter steady state efficiency as a function of torque converter slip.

The present description is related to controlling a driveline of a hybrid vehicle that includes a torque converter and torque converter lockup clutch. The hybrid vehicle may include an engine as is shown in FIG. 1. The engine of FIG. 1 may be included in a powertrain or driveline as is shown in FIG. 2. The driveline may have a torque converter having efficiency as shown in FIG. 3. The hybrid vehicle may be operated according to the method shown in FIGS. 4-11. The hybrid vehicle may launch from stopped or creep (e.g., a condition after vehicle stop where a brake is released and no driver demand has been input where the vehicle may move) conditions as shown in the sequences of FIGS. 12-15.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. DISG may provide torque to wheels 216 while engine 10 is operating or stopped rotating.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives DISG position via position sensor 271. Controller 12 may convert transmission input shaft position into input shaft speed via differentiating a signal from position sensor 271. Controller 12 may receive transmission output shaft torque from torque sensor 272. Alternatively, sensor 272 may be a position sensor, or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provides a driveline, comprising: an engine; a motor selectively coupled to the engine; a transmission including a torque converter and a torque converter lockup clutch, the transmission coupled to the motor; and a controller including executable instructions stored in non-transitory memory for providing torque to the transmission via adjusting torque through torque converter hydraulic and friction torque paths during a vehicle launch in response to a torque converter lockup clutch delay period. The driveline further comprises instructions to operate the motor in a speed control mode in response to driver demand torque being less than a threshold torque during a vehicle launch. The driveline further comprises instructions to operate the motor in a torque control mode in response to driver demand torque being greater than the threshold torque during a vehicle launch. The driveline further comprises instructions to provide hydraulic and friction torque paths through the torque converter in response to a driver demand being less than a threshold during vehicle launch. In some examples, the driveline further comprises instructions to provide only a hydraulic torque path through the torque converter in response to the driver demand being greater than the threshold during vehicle launch.

Referring now to FIG. 3, a plot of torque converter steady state efficiency versus speed ratio of torque converter turbine speed to torque converter impeller speed is shown. The horizontal axis represents a ratio of torque converter turbine speed to torque converter impeller speed. The vertical axis represents torque converter efficiency. Curve 302 describes the relationship between torque converter efficiency and speed ratio of torque converter turbine speed to torque converter impeller speed. It may be observed that torque converter efficiency increases as the speed ratio of torque converter turbine speed to torque converter impeller speed approaches one. The torque converter efficiency decreases as the speed ratio of torque converter turbine speed to torque converter impeller speed approaches zero. A torque converter having a speed ratio of less than one may be described as slipping. Thus, the driveline may operate more efficiently if the torque converter speed ratio is near a value of one. Also, note that the amount of hydraulic torque transferred from the torque converter impeller to the torque converter turbine is limited by the torque converter's hydraulic characteristics. The torque converter efficiency is a value of one if the torque converter clutch is rigidly locked-up.

Figure 4:
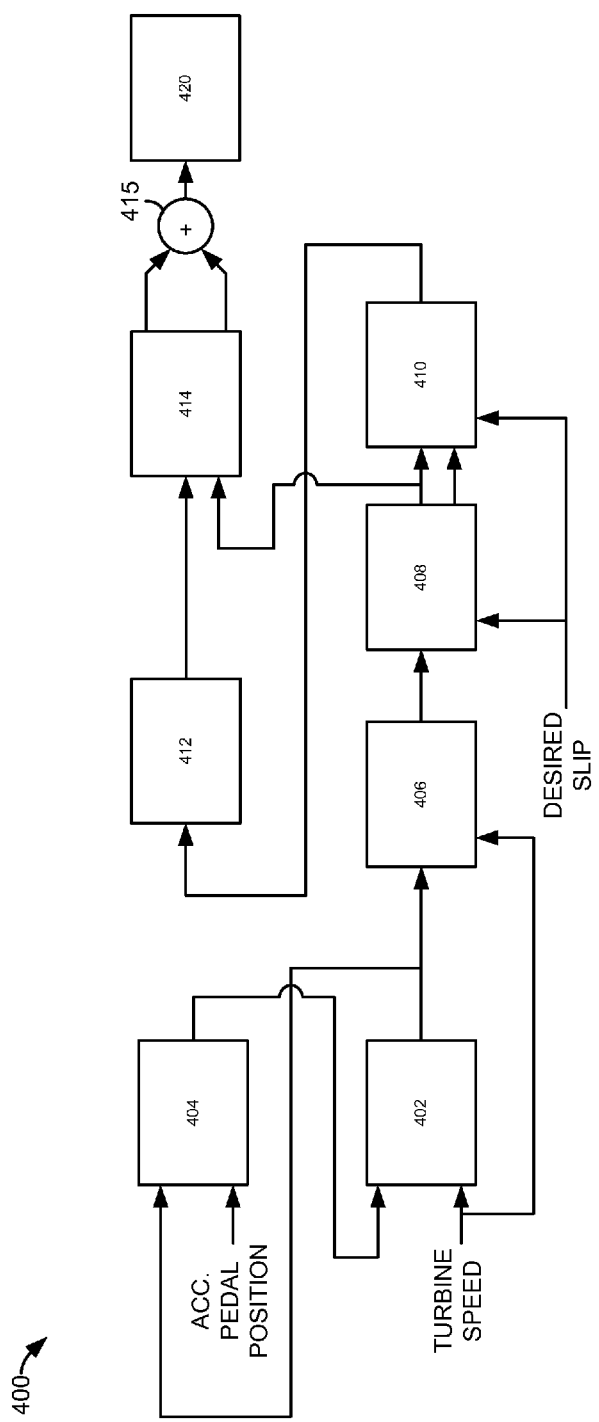
FIGS. 4-11 describe a method for operating a hybrid vehicle driveline.

Referring now to FIG. 4, a control system block diagram 400 for the system of FIGS. 1 and 2 is shown. Torque converter turbine speed is input to block 402 and accelerator pedal position is input to block 404. The controller outputs control to motive sources 412 (e.g., engine 10 and motor 240) and torque converter 414 which includes a torque converter lockup clutch.

At block 402, virtual torque converter impeller speed is determined during applied torque converter clutch launch (e.g., torque converter clutch starts to transfer friction torque from the torque converter impeller to the torque converter turbine) by assuming an open torque converter (e.g., torque converter clutch is not applied). The virtual torque converter impeller speed is used to determine a driver demand torque since driver demand torque is based on torque converter impeller speed and accelerator pedal position. The virtual torque converter impeller speed is determined because the actual torque converter impeller speed in combination with the accelerator pedal position does not provide an accurate driver demand torque when the torque converter lockup clutch is being closed since the torque converter impeller speed may be affected by the torque converter lockup clutch closing. The torque converter turbine torque is estimated from the driver demand torque based on virtual torque converter impeller speed as well as an empirically determined torque converter model. The virtual torque converter impeller speed is determined as described in FIG. 6. The virtual torque converter impeller speed is provided to blocks 404 and 406.

At block 404, accelerator pedal position and virtual torque converter impeller speed are inputs used to determine a virtual torque converter impeller torque. In one example, the virtual torque converter impeller speed and accelerator pedal position are used to index a table or function that outputs a desired torque converter impeller torque. The virtual torque converter impeller torque is input to block 402.

At block 406, the driver demand torque at the torque converter turbine is estimated. The torque converter turbine hydraulic torque is estimated by first determining the torque converter impeller torque from the following equation:

$$TQ_{imp-hyd} = f2(\omega_{imp} \cdot R)$$

where $TQ_{imp-hyd}$ is the torque converter hydraulic impeller torque, f2 is an empirically determined function describing torque converter hydraulic impeller torque based on a torque converter speed ratio R and torque converter speed $\omega_{imp}$. The torque converter speed ratio is described by the following equation:

$$R = \frac{\omega_{turb}}{\omega_{imp}}$$

where $\omega_{turb}$ is the torque converter turbine speed and $\omega_{imp}$ is the torque converter impeller speed. The torque converter turbine torque is determined by the following equation:

$$TQ_{turb-hyd} = TQ_{imp-hyd} \cdot f3(R)$$

where $TQ_{turb-hyd}$ is the torque converter turbine torque and f3 is an empirically determined function that is indexed via the value of R. The output of block 406 is supplied to block 408.

At block 408, a torque splitting strategy determines the amount of torque which is supplied to the torque converter turbine via the friction path (e.g., via the TCC) and via the hydraulic path (e.g., via hydraulic fluid in the torque converter). The torque splitting strategy determines hydraulic path torque and friction path torque based on the method described in FIGS. 7-10. Block 408 commands the torque converter clutch at block 414 and directs the torque converter hydraulic path torque to the impeller torque determining block 410.

At block 410, the desired torque converter impeller torque is determined from the hydraulic path turbine torque, the friction path torque and additional torque further determined by an engine speed or engine feedback control strategy. As an example, when torque converter impeller speed is controlled in a speed control mode via controlling engine or motor speed:

$$TQ_{imp-dmd} = TQ_{ff} + TQ_{fb}$$

where $TQ_{imp-dmd}$ is the impeller torque demand, $TQ_{ff}$ is the feedforward torque command. In one example $TQ_{ff} = TQ_{turb-hyd} + TQ_{fric}$, where $TQ_{turb-hyd}$ is the estimated turbine hydraulic torque and $TQ_{fric}$ is the estimated friction torque from converter clutch. $TQ_{fb}$ is the feedback torque command based on speed feedback, which may be a proportional/integral (PI) controller or a PI controller with inertial compensation or another controller strategy.

Block 410 commands the engine and/or motor to supply the desired torque converter impeller torque at block 412. Block 412 represents the engine and motor plants which are commanded to provide the torque transmitted via the hydraulic and friction torque paths. The motor and engine plants provide torque to the torque converter impeller at block 414 which represents the torque converter including the torque converter lockup clutch. The torque converter lockup clutch provides torque from the torque converter friction path to the torque converter turbine by at least partially closing. The torque converter supplies torque to the transmission input shaft at block 420 via the torque converter hydraulic path and the torque converter friction path. The hydraulic and friction torques are additive as indicated at summing junction 415.

In this way, torque may be provided to the transmission input shaft via torque converter hydraulic and friction torque paths. Further, the amount of torque transmitted via the hydraulic and friction torque paths may be adjusted based on vehicle operating conditions.

Figure 5:
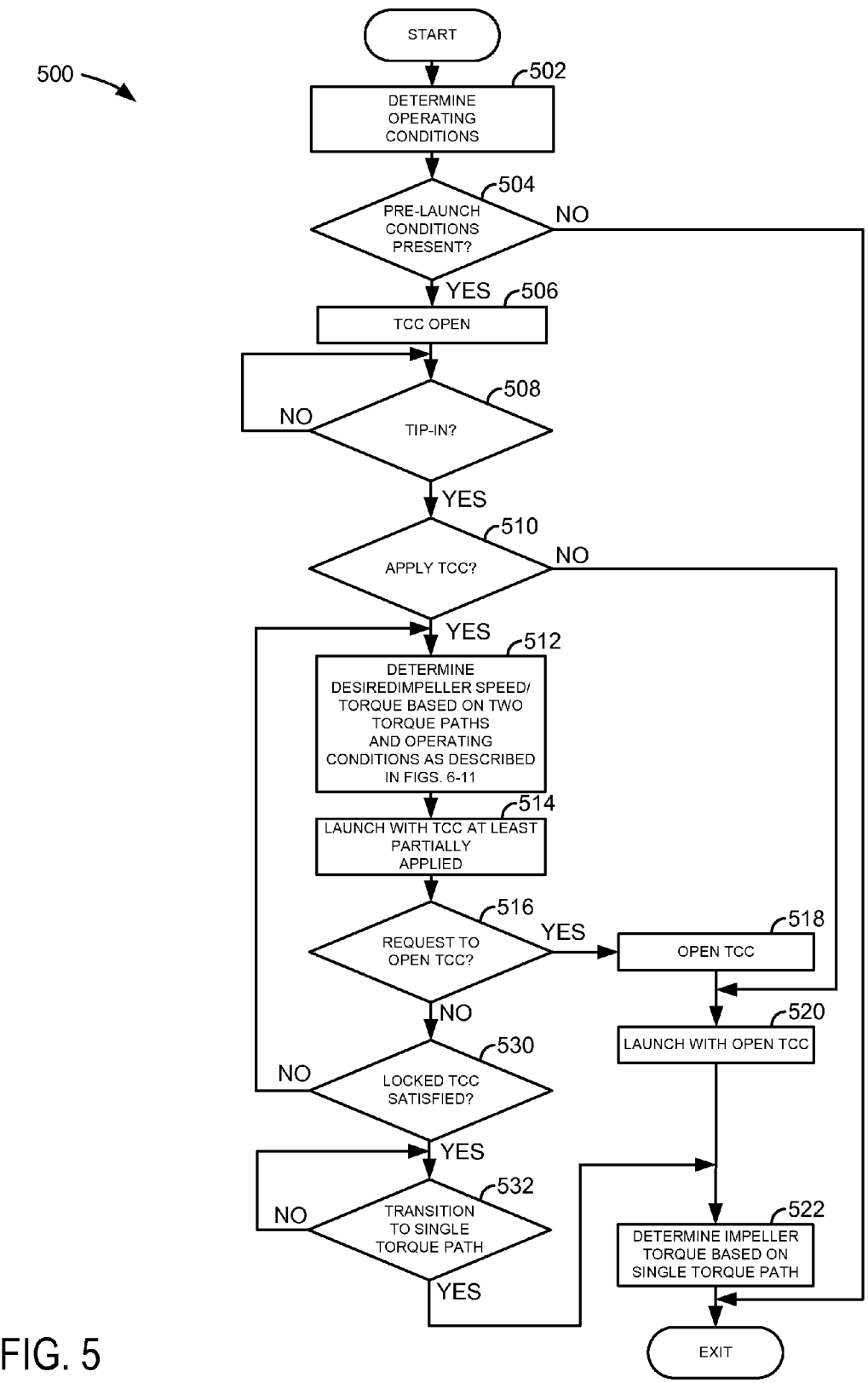

Referring now to FIG. 5, a method for selecting between launching a vehicle with an open or an at least partially closed torque converter lockup clutch is shown. The method of FIG. 5 may provide the vehicle launch sequences as are shown in FIGS. 12-15. A vehicle launch may be describes as a vehicle acceleration from zero speed or creep speed (e.g., vehicle speed after a vehicle is stopped and a brake pedal is released without the accelerator pedal being applied) in response to an increase in accelerator pedal position.

At 502, method 500 determined operating conditions. Operating conditions may include but are not limited to vehicle speed, driver demand torque, transmission fluid temperature, engine coolant temperature, and battery state of charge (SOC). Method 500 proceeds to 504 after operating conditions are determined.

At 504, method 500 judges if pre-launch conditions are present. Pre-launch conditions may include vehicle speed less than a threshold speed and driver demand torque less than a threshold torque. If method 500 judges that pre-launch conditions are met, the answer is yes and method 500 proceeds to 506. Otherwise, method 500 proceeds to exit.

At 506, method 500 opens the torque converter lockup clutch. The torque converter lockup clutch may be initially opened to prepare for a baseline open torque converter lockup clutch. Method 500 proceeds to 508 after the torque converter lockup clutch is opened.

At 508, method 500 judges if a driver has applied the accelerator pedal or tipped-in to the accelerator pedal. In one example, method 500 may judge that a driver has tipped-in if the accelerator pedal position has increased. If method 500 judges that a tip-in has happened or is ongoing, the answer is yes and method 500 proceeds to 510. Otherwise, the answer is no and method 500 returns to 508.

At 510, method 500 judges whether or not to apply or at least partially close the torque converter lockup clutch during vehicle acceleration from a vehicle speed of zero or a creep speed. The vehicle launch may last until the driver at least partially releases or reduces the accelerator pedal. In one example, the torque converter lockup clutch may be applied when driver demand torque is less than a threshold torque, accelerator pedal position is less than a threshold position, torque converter fluid temperature is greater than a first threshold temperature and less than a second threshold temperature, and when no diagnostic degradation of the driveline is determined. Thus, torque may be provided to a transmission via a torque converter hydraulic torque path a friction torque when driver demand is less than a threshold during vehicle launch. Torque may be provided to a transmission solely via the torque converter hydraulic torque path when driver demand is greater than a threshold during vehicle launch. If method 500 judges to apply the lockup clutch during launch, the answer is yes and method 500 proceeds to 512. Otherwise, the answer is no and method 512 proceeds to 520.

At 512, method 500 determines an amount of torque to provide to the torque converter turbine from the torque converter impeller via hydraulic and friction torque paths. The hydraulic torque path transfers torque from the torque converter impeller to the torque converter turbine via hydraulic fluid flowing between the impeller and the turbine. The friction torque path transfers torque from the torque converter impeller to the torque converter turbine via the clutch friction surfaces. Method 500 judges the amount of torque to transfer via the hydraulic and friction paths as is described in FIGS. 6-11. Method 500 proceeds to 514 after determining the amount of torque to transfer to the turbine via hydraulic and friction torque paths.

At 514, method 500 applies the torque converter clutch so that the torque converter lockup clutch is at least partially applied. The torque converter lockup clutch may be closed electrically or hydraulically. The amount of torque transferred via the torque converter lockup clutch may be based on a table or function that includes empirically determined torque capacity for the torque converter lockup clutch based on hydraulic fluid pressure or electrical current supplied to the torque converter clutch. For example, if it is desired for the lockup clutch to transfer 50 Nm of torque, 50 Nm is used to index the torque converter lockup clutch table, and the table outputs a hydraulic line pressure or current supplied that allows the torque converter lockup clutch so that the torque converter lockup clutch transfers 50 Nm. Method 500 proceeds to 516 after beginning to apply the torque converter lockup clutch.

At 516, method 500 judges if there is a change in operating conditions such that the torque converter lockup clutch is desired open. For example, if the driver increases the accelerator pedal position or driver demand torque to a level greater than a threshold amount, the torque converter lockup clutch may be desired open to increase torque multiplication through the torque converter and increased torque flow through the torque converter hydraulic torque path. If method 500 judges that there is a change and a request to open the torque converter lockup clutch, the answer is yes and method 500 proceeds to 518. Otherwise, the answer is no and method 500 proceeds to 530.

At 518, method 500 fully opens the torque converter lockup clutch. The torque converter lockup clutch may be opened by reducing pressure of hydraulic fluid supplied to the torque converter lockup clutch or by reducing current supplied to the torque converter lockup clutch. The torque converter lockup clutch application force may be ramped out to reduce the possibility of a driveline torque disturbance. Method 500 proceeds to 520 after the torque converter lockup clutch is opened.

At 520, method 500 continues the vehicle launch with the torque converter clutch fully open. The hydraulic torque path may provide torque multiplication to increase vehicle acceleration. Method 500 proceeds to 522 after the torque converter lockup clutch is released.

At 522, method 500 determines torque converter impeller torque based on providing torque converter turbine torque solely via the hydraulic torque path through the torque converter. In one example, the torque converter impeller torque is based on accelerator pedal position and torque converter impeller speed. The torque converter impeller speed and the accelerator pedal position are used to index a table or function that outputs desired torque converter impeller torque. The desired torque converter impeller torque is commanded to the motor and the engine so that the motor and/or engine provide the desired torque converter impeller torque. Method 500 proceeds to exit after the motor and engine are commanded to provide the desired torque converter impeller torque.

At 530, method 500 judges if the conditions for fully locking the torque converter lockup clutch are satisfied. In one example, torque converter lockup clutch locking conditions include the torque converter turbine speed being within a threshold speed of the torque converter impeller speed. Further, the torque converter impeller speed and the torque converter turbine speed may be required to be greater than threshold speeds. If conditions for locking the torque converter lockup clutch are satisfied, the answer is yes and method 500 proceeds to 522. Otherwise, the answer is no and method 500 returns to 512. Thus, method 500 provides for changing determination of torque converter turbine torque based on friction and hydraulic torque paths to being based solely on single torque path.

At 532, method 500 transitions to determining desired torque converter impeller torque based on accelerator pedal position and actual impeller speed. In one example, desired torque converter impeller torque is ramped from a previous value to a new value based on accelerator pedal position and actual impeller speed. If the transition is complete, the answer is yes and method 500 proceeds to 522. Otherwise, the answer is no and method 500 returns to 532 to continue transitioning.

Figure 6:
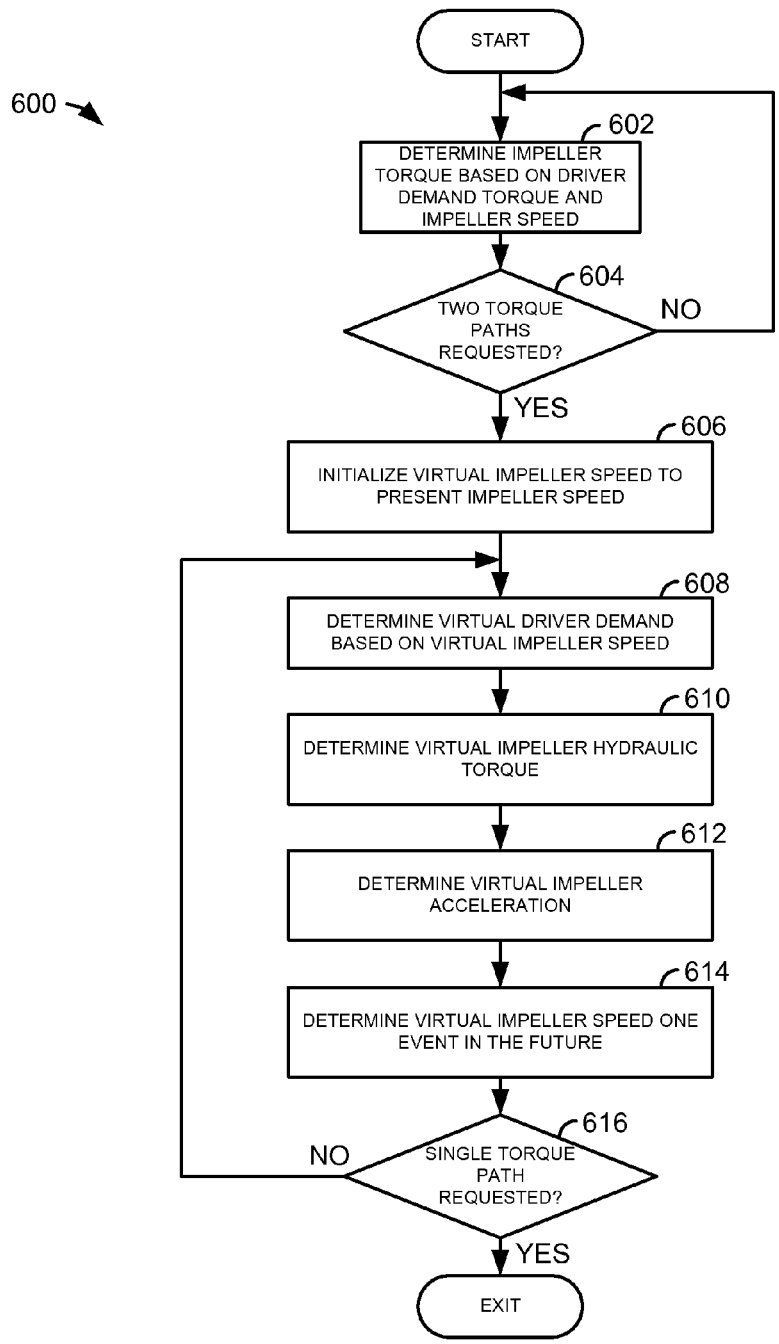

Referring now to FIG. 6, a method for determining virtual torque converter impeller speed is shown. Virtual torque converter impeller speed is an estimate of torque converter impeller speed if the torque converter lockup clutch was fully open. The virtual torque converter impeller speed allows for estimating the torque demand at the torque converter turbine and further allows for determining the torque converter hydraulic path torque and the torque converter friction path torque even though the torque converter impeller speed may vary from the virtual torque converter impeller speed because the torque converter lockup clutch is being applied. This method enables consistent torque determination at the turbine side of the torque converter for an open torque converter launch and applied torque converter launch (e.g., vehicle launch with the torque converter at least partially applied).

At 602, method 600 determines torque converter impeller torque based on driver demand torque and torque converter impeller speed. The driver demand torque may be based on accelerator pedal position. In one example, the driver demand torque and the torque converter impeller speed are used to index a table of empirically determined torque converter impeller torque values and the table outputs the torque converter impeller torque. Method 600 proceeds to 604 after the torque converter impeller torque is determined.

At 604, method 600 judges if it is desired to launch the vehicle by transferring torque converter impeller torque via two torque paths, a friction torque path (e.g., through the torque converter lockup clutch) and via the torque converter hydraulic path (e.g., though hydraulic fluid between the torque converter impeller and the torque converter turbine). In one example, it may be desirable to launch the vehicle via transferring torque converter impeller torque through two torque paths when driver demand torque is less than a threshold and when accelerator pedal position is less than a threshold during a vehicle launch. If method 600 judges to launch the vehicle by transferring torque converter impeller torque via two torque paths, the answer is yes and method 600 proceeds to 606. Otherwise, the answer is no and method 600 returns to 602.

At 606, method 600 initializes the virtual torque converter impeller speed to the present torque converter impeller speed as determined via a speed sensor sensing motor and/or engine speed. Thus, the virtual impeller speed may be expressed as VirtImpSpd(k)=present actual torque converter impeller speed, where k is the number of times the virtual torque converter impeller speed has been determined. Method 600 proceeds to 608 after the initial virtual torque converter impeller speed is determined.

At 608, method 600 determines a virtual driver demand based on the virtual impeller speed and the accelerator pedal position. The virtual driver demand may be expressed as VirtDmd(k)=f1(VirtImpSpd(k), ActPed(k)), where f1 is a table of empirically determined driver demand values and ActPed is the actual accelerator pedal position. Method 600 proceeds to 610 after the virtual driver demand is determined.

At 610, method 600 determines the virtual torque converter impeller hydraulic torque. The virtual torque converter impeller hydraulic torque may be expressed as TQimp_hyd_virt(k)=f2(VirtImpSpd(k), ActTurbSpd(k)), where TQimp_hyd_virt is the virtual torque converter impeller hydraulic torque, f2 is a table or function of empirically determined virtual torque converter impeller hydraulic torque values, ActTurbSpd is the present actual torque converter turbine speed which may be sensed via a speed or position sensor. Method 600 proceeds to 612 after the virtual torque converter impeller hydraulic torque is determined.

At 612, method 600 determines virtual torque converter impeller acceleration. The virtual torque converter impeller acceleration may be expressed as VirtImpAcc(k)=(VirtDmd(k)−TQimp_hyd_virt(k))/Jimp, where Jimp is torque converter impeller inertia. Method 600 proceeds to 614 after the virtual torque converter impeller acceleration is determined.

At 614, method 600 determines virtual impeller speed one event into the future. The virtual impeller speed one event in the future is expressed as VirtImpSpd(k+1)=VirtImpAcc(k)*Δt+VirtImpSpd(k). Method 600 proceeds to 616 after the virtual impeller speed one event in the future is determined.

At 616, method 600 judges if it is desired to determine torque converter turbine torque based on a single torque path (e.g., the hydraulic torque path). Method 600 may judge that it is desirable to determine torque converter turbine torque based on a single torque path in response to driver demand torque being greater than a predetermined threshold. If method 600 judges it is desirable to determine torque converter turbine torque based on a single torque path, the answer is yes and method 600 exits. Otherwise, the answer is no and method 600 returns to 608.

Thus, method 600 determines virtual torque converter impeller speed for the present event and one event into the future. The torque converter impeller torque is determined from the virtual torque converter impeller speed. In particular, torque converter impeller torque is determined via the equation $TQ_{imp\text{-}hyd}=f2(\omega_{imp} \cdot R)$ described at 406 of FIG. 4.

Figure 7:
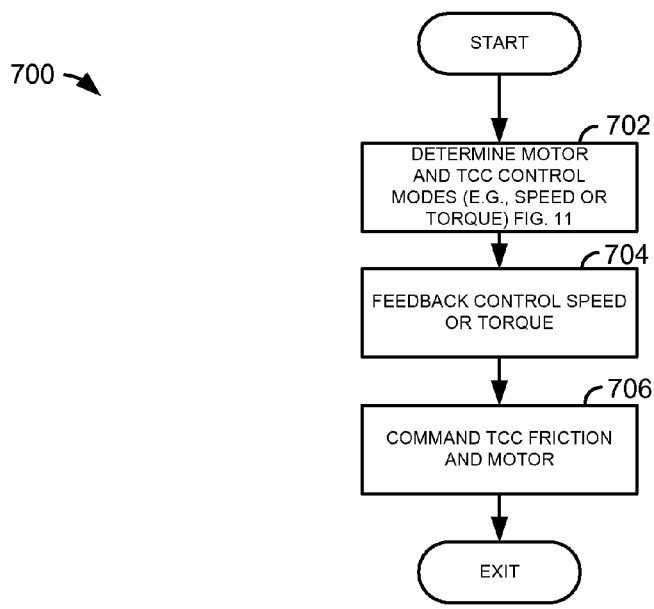

Referring now to FIG. 7, a method for controlling a motor and/or an engine in a speed or torque control mode during vehicle launch is shown. The method of FIG. 7 may be included in the method of FIG. 5.

At 702, method 700 determines whether to control the torque converter impeller in a speed control mode or a torque control mode. Method 700 judges whether to operate the torque converter impeller in a speed control or torque control mode based on the method of FIG. 11. The torque converter impeller is operated in a speed control or torque control mode by operating the motor and/or engine in speed or torque control mode. In torque control mode, engine and/or motor torque is controlled to a desired torque and engine and/or motor speed is allowed to vary to provide the desired torque. In speed control mode, engine and/or motor speed is controlled to a desired speed and engine and/or motor torque is allowed to vary to provide the desired speed. Method 700 proceeds to 704 after it is determined whether to operate in speed or torque control mode.

At 704, method 700 provides feedback control of torque converter impeller speed or torque. If it is desired to operate the torque converter impeller in speed control mode, the engine and/or motor torque are adjusted to operate the torque converter impeller at the desired speed. The torque converter impeller speed is feedback to the controller and torque converter impeller speed adjustments are determined if torque converter impeller speed is greater or less than a desired speed. Likewise, if it is desired to operate the torque converter impeller in torque control mode, the engine and/or motor torque are adjusted to operate the torque converter impeller at the desired torque. The torque converter impeller torque is feedback to the controller and torque converter impeller torque adjustments are determined if torque converter impeller torque is greater or less than a desired torque. The torque converter impeller torque may be sensed via a torque sensor or inferred. Alternatively, the torque converter impeller torque may be controlled without torque feedback or torque inference. Method 700 proceeds to 706 after the torque converter impeller speed or torque is feedback adjustments are determined.

At 706, method 700 commands the torque converter lockup clutch to provide a desired amount of torque transfer capacity from the torque converter impeller to the torque converter turbine via the torque converter lockup clutch. The torque converter lockup torque capacity is adjusted by adjusting a force applied to the torque converter lockup clutch. Further, the motor and/or engine torque are commanded based on the desired torque converter impeller speed or torque and feedback adjustments. The desired torque converter impeller speed or torque may vary with vehicle operating conditions. The engine torque or speed is adjusted via adjusting an engine torque actuator such as a throttle, spark timing, cam timing, or fuel amount. The motor torque or speed is adjusted via adjusting an amount of current supplied to the motor. Method 700 proceeds to exit after the engine, motor, and torque converter lockup clutch are adjusted.

Figure 8:
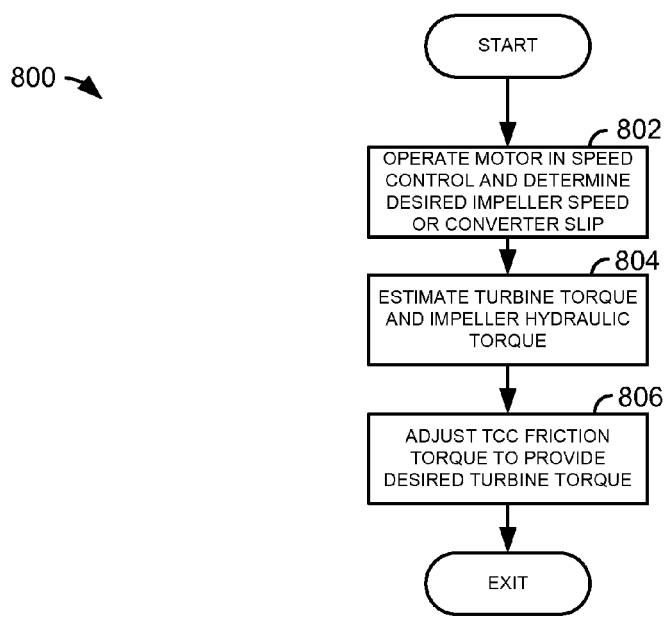

Referring now to FIG. 8, a method for operating the engine and/or motor in speed control mode while providing a desired torque converter turbine torque is shown. It may be desirable to operate the engine and/or motor in a speed control mode to increase torque converter efficiency as compared to operating the torque converter in a torque control mode where torque converter impeller speed may be much different than torque converter turbine speed.

Figure 14:
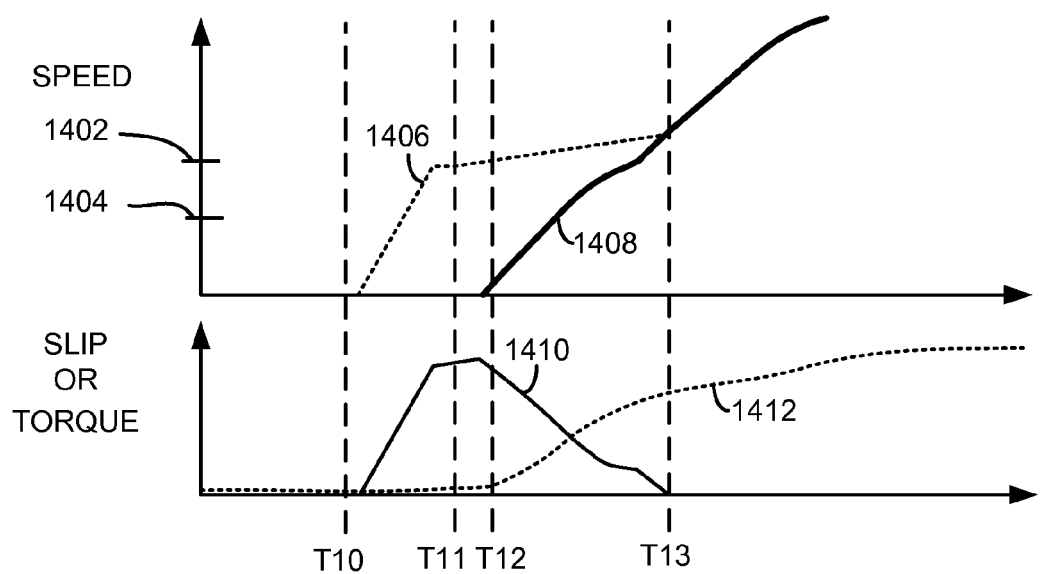

At 802, method 800 operates the engine and/or motor in speed control mode to control torque converter impeller speed to a desired speed. The desired speed may vary depending on vehicle operating conditions. For example, the desired impeller speed may be adjusted to a minimum speed at which a transmission pump outputs a desired output pressure to operate transmission clutches. Alternatively, the desired impeller speed may be adjusted to a base engine idle speed that is greater than the minimum speed at which the transmission pump outputs the desired output pressure. In still other examples, when the transmission, engine, or other driveline component is cold, the desired impeller speed may be adjusted to a speed greater than the base engine idle speed. The engine and/or motor torque may vary when the engine and/or motor speed is controlled to the desired speed. The torque converter impeller speed may also be increased in response to torque converter lockup clutch delay so as to increase torque converter slippage via increasing the speed difference between torque converter impeller speed and torque converter turbine speed as is shown in FIG. 14. Alternatively, a desired slip amount (e.g., a difference between torque converter impeller speed and torque converter turbine speed) may be determined based on operating conditions. The torque converter impeller speed may be commanded to provide the desired amount of slip. Method 800 proceeds to 804 after initiating engine and/or motor in speed control mode.

At 804, method 800 estimates torque converter turbine torque demand and actual torque converter impeller hydraulic torque. The actual torque converter impeller hydraulic torque is determined from the following equation:

$$TQ_{imp\_hyd} = f2(\omega_{imp} \cdot R)$$

where $TQ_{imp\_hyd}$ is the actual torque converter impeller torque, f2 is an empirically determined function describing torque converter impeller torque based on a torque converter speed ratio R and torque converter impeller speed $\omega_{imp}$. The torque converter speed ratio is described by the following equation:

$$R = \frac{\omega_{turb}}{\omega_{imp}}$$

where $\omega_{turb}$ is the torque converter turbine speed and $\omega_{imp}$ is the torque converter impeller speed. The demand torque converter turbine torque $TQ_{turb\_dmd}$ is determined by the following equation:

$$TQ_{turb\_dmd} = f2(\omega_{imp\_virt} \cdot R_{virt}) * f3(R_{virt})$$

where $TQ_{turb\_dmd}$ is the estimated driver demand at torque converter turbine, $f2(\omega_{imp\_virt} \cdot R_{virt})$ is the estimated hydraulic torque at torque converter impeller with virtual impeller speed $\omega_{imp\_virt}$ and slip ratio $R_{virt} \cdot f3(R_{virt})$ is the torque multiplication ratio for torque converter. $R_{virt}$ is the virtual slip ratio defined as:

$$R_{virt} = \frac{\omega_{turb}}{\omega_{imp\_virt}}$$

f2 and f3 are empirically determined functions that are indexed via the value of R. Method 800 proceeds to 806 after the torque converter turbine torque demand and actual impeller hydraulic torque are estimated.

At 806, method 800 adjusts the torque converter lockup clutch application force to provide a torque converter lockup clutch capacity (e.g., an amount of torque the torque converter may transfer between the impeller and the turbine). In particular, the torque converter lockup clutch may be adjusted based on the following equations:

$$TQ_{fric\_dmd} = TQ_{turb\_dmd} - TQ_{imp\_hyd} * f3(R)$$
$$= f2(\omega_{imp-virt} \cdot R_{virt}) * f3(R_{virt}) - f2(\omega_{imp} \cdot R) * f3(R)$$

where the variables are described at 804. Method 800 proceeds to exit after the torque converter lockup clutch torque capacity is adjusted.

Figure 9:
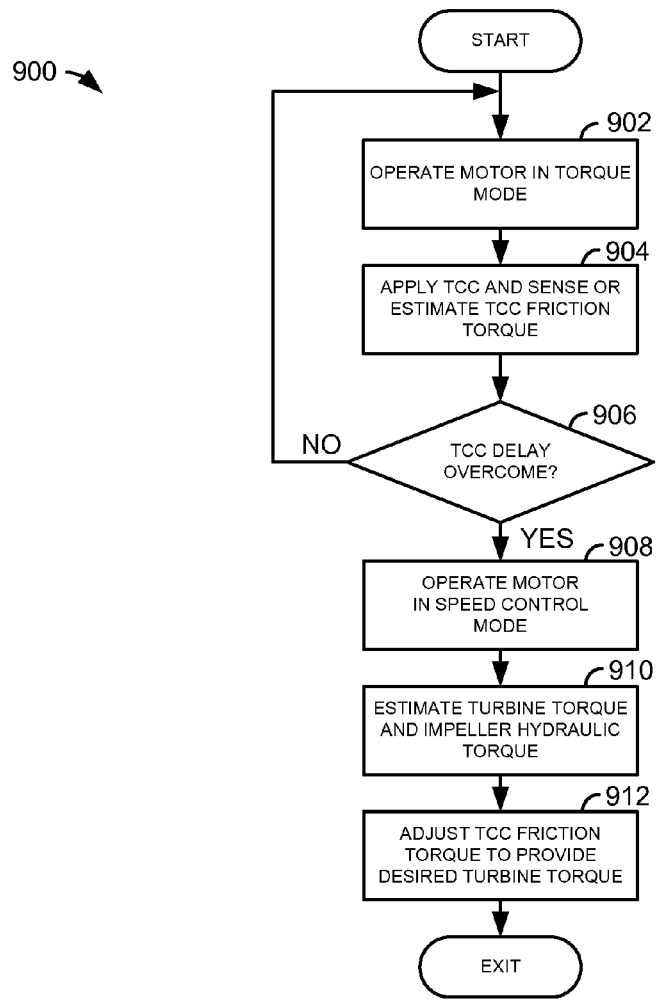

Referring now to FIG. 9, a method for operating the motor and/or engine in torque and speed control modes during vehicle launch is shown. By operating the engine and/or motor in torque and speed control modes during vehicle launch, it may be possible to provide improve torque response while maintaining a higher torque converter efficiency.

At 902, method 900 operates the motor and/or engine in a torque control mode. In torque control mode, engine and/or motor torque is controlled to a desired torque and engine and/or motor speed varies depending on the load applied to the motor and/or engine. The engine torque is adjusted to a desired torque via adjusting an engine torque actuator such as a throttle, cam, spark timing, or fuel injection amount. The motor torque is adjusted via adjusting an amount of current supplied to the motor. The motor and engine torque are adjusted to provide at torque based on accelerator pedal position and torque converter impeller speed. In particular, accelerator pedal position and torque converter impeller speed index a table or function of empirically determined torque converter impeller torque amounts. The table or function outputs the torque amount and the engine and/or motor torque is adjusted to provide the torque output from the table or function. Method 900 proceeds to 904 after engine and/or motor torque is adjusted.

At 904, method 900 applies the torque converter lockup clutch to begin transferring torque converter impeller torque to the torque converter turbine via the friction torque path. The amount of torque transferred via the torque converter lockup clutch may be estimated by hydraulic pressure or electrical current supplied to the torque converter lockup clutch. In one example, a table of empirically determined torque converter lockup clutch torque capacity values is indexed based on hydraulic pressure supplied to the torque converter lockup clutch. The table outputs an estimate of the torque converter lockup clutch torque capacity (e.g., an amount of torque the torque converter lockup clutch may transfer). Method 900 proceeds to 906 after the torque converter clutch lockup capacity is determined.

At 906, method 900 judges if the torque converter lockup clutch torque delay has been overcome. In one example, method 900 judges that the torque converter lockup clutch torque delay has been overcome when the torque converter lockup torque capacity exceeds a threshold value. If method 900 judges that the torque converter lockup clutch delay has been overcome, the answer is yes and method 900 proceeds to 908. Otherwise, the answer is no and method 900 returns to 902.

At 908, method 900 operates the engine and/or motor in speed control mode to control torque converter impeller speed to a desired speed. The desired speed may vary depending on vehicle operating conditions. For example, the desired impeller speed may be adjusted to a minimum speed at which a transmission pump outputs a desired output pressure to operate transmission clutches. Alternatively, the desired impeller speed may be adjusted to a base engine idle speed that is greater than the minimum speed at which the transmission pump outputs the desired output pressure. In still other examples, when the transmission, engine, or other driveline component is cold, the desired impeller speed may be adjusted to a speed greater than the base engine idle speed. The engine and/or motor torque may vary when the engine and/or motor speed is controlled to the desired speed. Alternatively, a desired slip amount (e.g., a difference between torque converter impeller speed and torque converter turbine speed may be determined based on operating conditions. The torque converter turbine speed may be commanded to provide the desired amount of slip. Method 900 proceeds to 910 after initiating engine and/or motor in speed control mode.

At 910, method 900 estimates torque converter turbine demand torque and actual torque converter impeller hydraulic torque. The torque converter impeller hydraulic torque is estimated from the following equation:

$$TQ_{imp\_hyd} = f2(\omega_{imp} \cdot R)$$

where $TQ_{imp\_hyd}$ is the torque converter impeller torque, f2 is an empirically determined function describing torque converter impeller torque based on a torque converter speed ratio R and torque converter impeller speed $\omega_{imp}$. The torque converter speed ratio is described by the following equation:

$$R = \frac{\omega_{turb}}{\omega_{imp}}$$

where $\omega_{turb}$ is the torque converter turbine speed and $\omega_{imp}$ is the torque converter impeller speed. The demand torque converter turbine torque $TQ_{turb\_dmd}$ is determined by the following equation:

$$TQ_{turb\_dmd} = f2(\omega_{imp-virt} \cdot R_{virt}) * f3(R_{virt})$$

where $TQ_{turb\_dmd}$ is the estimated driver demand at torque converter turbine, $f2(\omega_{imp-virt} \cdot R_{virt})$ is the estimated hydraulic torque at torque converter impeller with virtual impeller speed $\omega_{imp-virt}$ and slip ratio $R_{virt} \cdot f3(R_{virt})$ is the torque multiplication ratio for torque converter. $R_{virt}$ is the virtual slip ratio defined as:

$$R_{virt} = \frac{\omega_{turb}}{\omega_{imp\_virt}}$$

f2 and f3 are empirically determined functions that are indexed via the value of R. Method 900 proceeds to 912 after the torque converter turbine demand torque and actual impeller hydraulic torque are estimated.

At 912, method 900 adjusts the torque converter lockup clutch application force to provide a torque converter lockup clutch capacity (e.g., an amount of torque the torque converter may transfer between the impeller and the turbine). In particular, the torque converter lockup clutch may be adjusted based on the following equations:

$$TQ_{fric\_dmd} = TQ_{turb\_dmd} - TQ_{imp\_hyd} * f3(R)$$
$$= f2(\omega_{imp-virt} \cdot R_{virt}) * f3(R_{virt}) - f2(\omega_{imp} \cdot R) * f3(R)$$

where the variables are as described at 804. The torque converter lockup clutch application force is adjusted via adjusting current or hydraulic pressure supplied to the torque converter lockup clutch, and the application force adjusts the torque converter lockup clutch torque capacity to the torque converter friction path torque amount $TQ_{frict}$. Method 900 proceeds to exit after the torque converter lockup clutch torque capacity is adjusted.

Figure 10:
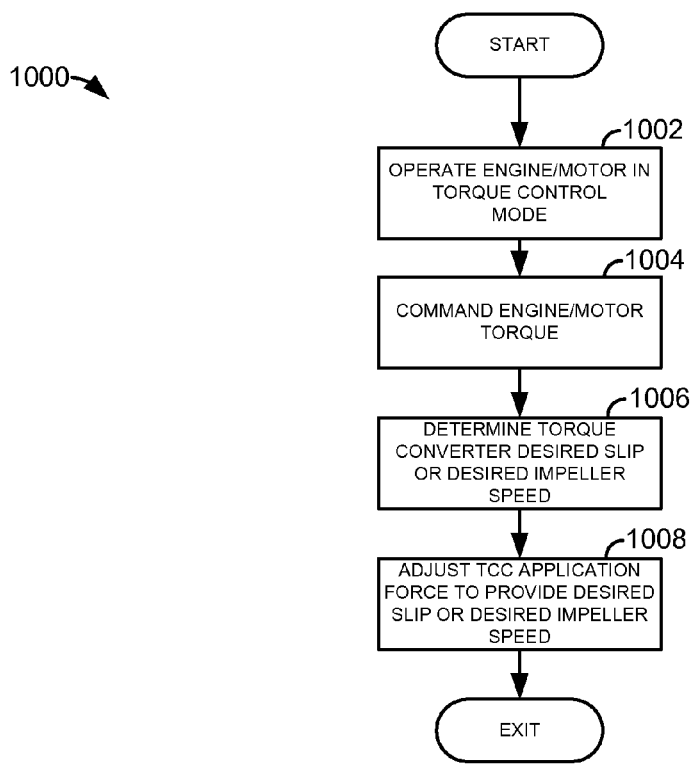

Referring now to FIG. 10, a method is shown for operating a motor and/or engine in torque control mode and adjusting application force of the torque converter lockup clutch to provide a desired torque converter impeller speed or a desired amount of slip (e.g., speed difference) between a torque converter impeller and a torque converter turbine.

At 1002, method 1000 operates the motor and/or engine in a torque control mode. In torque control mode, engine and/or motor torque is controlled to a desired torque and engine and/or motor speed varies depending on the load applied to the motor and/or engine. The engine torque is adjusted to a desired torque via adjusting an engine torque actuator such as a throttle, cam, spark timing, or fuel injection amount. The motor torque is adjusted via adjusting an amount of current supplied to the motor. The motor and engine torque are adjusted to provide at torque based on accelerator pedal position and torque converter impeller speed. Specifically, torque converter impeller torque is estimated based on the virtual torque converter impeller speed as previously described. Method 1000 proceeds to 1004 after engine and/or motor torque is adjusted.

At 1004, method 1000 adjusts the motor and/or engine torque demand based on the following equation:

$$TQ_{imp\_dmd} = \frac{TQ_{turb\_dmd} - TQ_{fric}}{f3(R)} + TQ_{fric}$$

where $TQ_{mot/eng}$ is the commanded motor and/or engine torque, $TQ_{turb\_dmd}$ is the torque converter turbine torque demand, $TQ_{fric}$ is the estimated torque converter friction path torque (e.g., torque converter lockup clutch torque transferring capacity), and f3(R) is the torque converter torque ratio as a function of slip ratio R. R is defined by the equation:

$$R = \frac{\omega_{turb}}{\omega_{imp}}$$

where $\omega_{turb}$ is the turbine speed and $\omega_{imp}$ is the impeller speed. Method 1000 proceeds to 1006 after commanding motor and/or engine torque.

At 1006, method 1000 determines the desired torque converter impeller speed or desired torque converter slip amount. The desired torque converter impeller speed may vary depending on vehicle operating conditions. For example, the desired impeller speed may be adjusted to a minimum speed at which a transmission pump outputs a desired output pressure to operate transmission clutches. Alternatively, the desired impeller speed may be adjusted to a base engine idle speed that is greater than the minimum speed at which the transmission pump outputs the desired output pressure. In still other examples, when the transmission, engine, or other driveline component is cold, the desired impeller speed may be adjusted to a speed greater than the base engine idle speed. Alternatively, a desired slip amount (e.g., a difference between torque converter impeller speed and torque converter turbine speed) may be determined based on operating conditions. The torque converter impeller speed may be commanded to provide the desired amount of slip. Method 1000 proceeds to 1008 after initiating engine and/or motor in speed control mode.

At 1008, method 1000 adjusts the torque converter lockup clutch application force to provide the desired torque converter impeller speed or torque converter slip. For example, if the desired torque converter speed is 400 RPM and the present torque converter impeller speed is 500 RPM, the torque converter lockup clutch application force is increased to slow the torque converter impeller and transfer torque from the torque converter impeller to the torque converter turbine. Likewise, if the desired torque converter speed is 500 RPM and the present torque converter impeller speed is 400 RPM, the torque converter lockup clutch application force is decreased to accelerate the torque converter impeller and reduce torque transferred from the torque converter impeller to the torque converter turbine. The torque converter lockup clutch application force may also be adjusted in a similar way to increase or decrease torque converter slip so that a desired slip amount is provided. Additionally, the torque demand for the torque converter lockup clutch is limited to be less than the estimated turbine torque demand. Method 1000 proceeds to exit after adjusting the torque converter lockup clutch application force and torque capacity.

Figure 11:
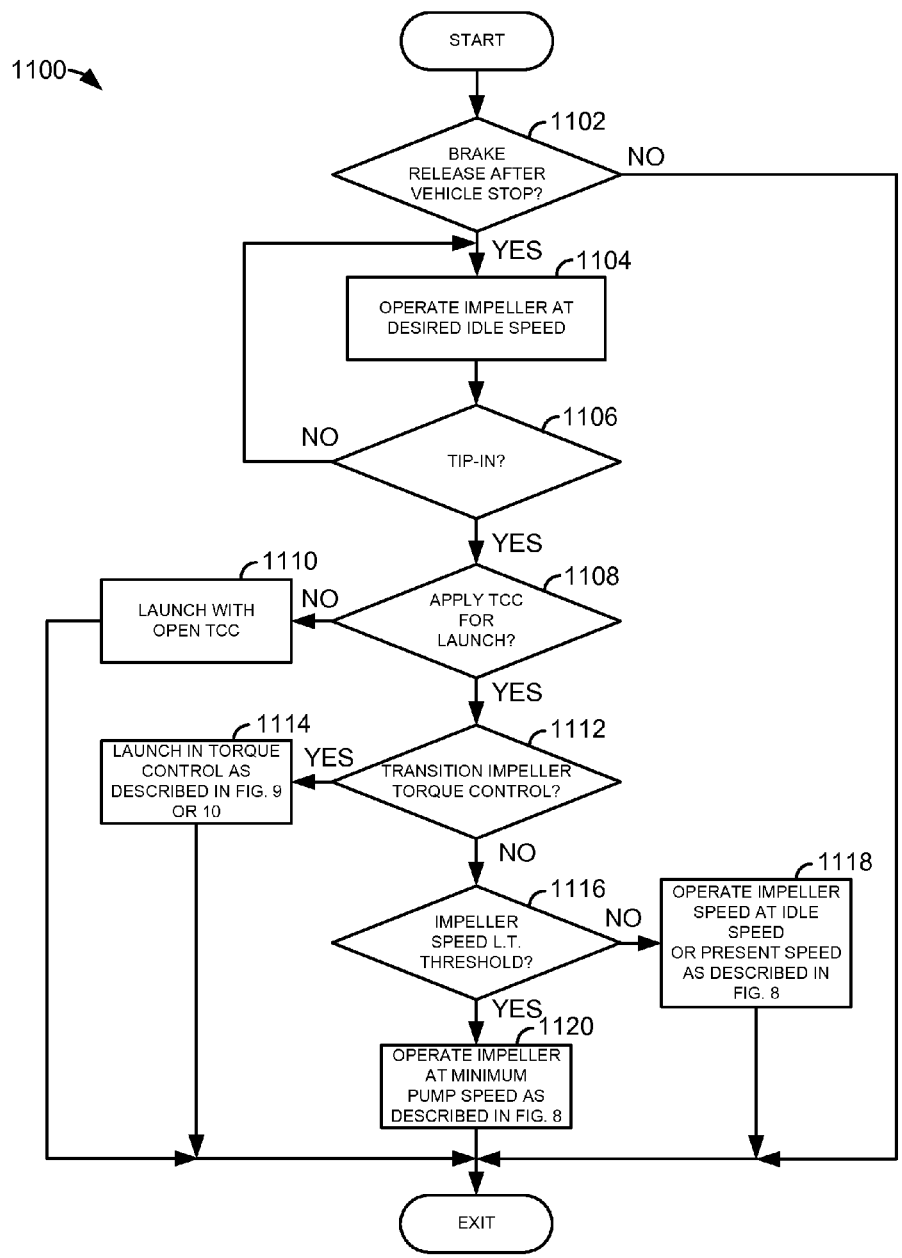

Referring now to FIG. 11, a method for selecting a vehicle launch control mode is shown. The control mode may be a speed control mode, a torque control mode, or a combination of speed and torque control modes.

At 1102, method 1100 judges if a brake pedal is released after a vehicle stop. The engine and/or motor may be stopped when the vehicle is stopped to conserve energy. The brake pedal may be determined to be released via a signal from a brake pedal sensor. If method 1100 judges that the brake pedal is released after a vehicle stop, the answer is yes and method 1100 proceeds to 1104. Otherwise, the answer is no and method 1100 proceeds to exit.

At 1104, method 1100 operates the motor and/or engine in a speed control mode (e.g., torque converter impeller speed control) while waiting for a tip-in (e.g., increase in accelerator pedal position) to initiate vehicle launch. The motor and/or engine may be operated at different selected speeds based on operating conditions. For example, the motor may be operated at a minimum speed for a transmission pump to supply transmission fluid at a desired pressure. Such a speed may be a lowest commanded torque converter impeller speed. Additionally, the motor and/or engine may operate at a base engine idle speed (e.g., 800 RPM) or a speed greater than a base idle speed when the engine temperature is less than a threshold. Method 1100 proceeds to 1106 after the motor and/or engine are commanded to a desired speed in a speed control mode.

At 1106, method 1100 judges if a tip-in has occurred. A tip-in may be determined based on a change in accelerator pedal position. If method 1100 judges that a tip-in has occurred, the answer is yes and method 1100 proceeds to 1108. Otherwise, the answer is no and method 1100 returns to 1104.

At 1108, method 1100 judges if it is desired to apply the torque converter lockup clutch (TCC) during vehicle launch. An open torque converter lockup clutch may be desired in response to a tip-in or accelerator pedal position greater than a first threshold amount. A large torque request or accelerator pedal position may be indicated by a tip-in greater than the first threshold amount. Greater torque multiplication may be desired during a greater tip-in to accelerate the vehicle more quickly. If method 1100 judges that a tip-in greater than a first threshold amount or accelerator pedal position greater than a first threshold amount, it may be judged that it is not desirable to apply the TCC during launch. Therefore, the answer is no and method 1100 proceeds to 1110. Otherwise, the answer is yes and method 1100 proceeds to 1112.

At 1110, the torque converter lockup clutch is held open to provide a maximum amount of torque multiplication to accelerate the vehicle. The open torque converter lockup clutch may reduce torque converter efficiency, but the vehicle may accelerate more quickly. Method 1100 proceeds to exit after the torque converter lockup clutch is opened. Note that the torque converter lockup clutch may be closed after torque converter turbine speed is within a threshold speed of torque converter impeller speed after or during vehicle launch.

At 1112, method 1100 judges if it is desired to transition the torque converter impeller, and motor and/or engine to a torque control mode while applying the torque converter lockup clutch. The torque converter impeller is in speed control when the engine and/or motor are in speed control. The torque converter impeller is in torque control when the engine and/or motor are in torque control. By operating the impeller and motor and/or engine in torque control mode, the torque converter impeller may be adjusted to a torque based on the driver demand torque so that additional torque may be transferred to the torque converter impeller via the hydraulic or friction torque path. In one example, method 110 judges that it may be desired to operate the impeller and motor and/or engine in a torque control mode when the driver demand torque or accelerator pedal position is less greater than a second threshold, the second threshold less than the first threshold. If method 1100 judges that a tip-in greater than a second threshold amount or accelerator pedal position greater than a second threshold amount, it may be judged that it is desired to operate the torque converter impeller and motor and/or engine in a torque control mode. Therefore, the answer is yes and method 1100 proceeds to 1114. Otherwise, the answer is no and method 1100 proceeds to 1116.

At 1114, method 1100 operates the torque converter impeller in a torque control mode while applying the TCC as described in FIG. 9 or 10. In one example, the method of FIG. 9 is selected in response to a first group of operating conditions, and the method of FIG. 10 is selected in response to a second group of operating conditions. Method 1100 proceeds to exit after the torque converter impeller and motor and/or engine are operated in a torque control mode during vehicle launch.

At 1116, method 1100 judges if a desired torque converter impeller speed is less than (L.T.) a threshold speed. The desired torque converter speed may be a minimum transmission pump speed to provide transmission fluid at a minimum desired pressure, a base engine idle speed, or a speed greater than a base engine idle speed. Further, if the tip-in event occurs before the torque converter impeller reaches a desired torque converter impeller speed, the desired torque converter speed may be adjusted to the present torque converter impeller speed. However, if the present torque converter impeller speed is less than a minimum speed for the transmission pump to output a desired pressure, the desired torque converter speed is adjusted to the minimum transmission pump speed to provide the desired pressure. If method 1100 judges that desired torque converter impeller speed is less than a threshold, the answer is yes and method 1100 proceeds to 1120. Otherwise, the answer is no and method 1100 returns to 1118.

At 1120, the torque converter impeller is operated in a speed control mode where the torque converter impeller is rotate by the motor and the motor is operated at a minimum speed where the transmission fluid pump supplies transmission fluid at a minimum desired pressure as described in FIG. 8. Method 1100 proceeds to exit after the motor and torque converter impeller are operated during speed control during the vehicle launch.

At 1118, the torque converter impeller is operated in a speed control mode where the torque converter impeller is rotate by the motor or engine at a speed greater than the minimum speed where the transmission fluid pump supplies transmission fluid at a minimum desired pressure as described in FIG. 8. Method 1100 proceeds to exit after the motor and torque converter impeller are operated during speed control during the vehicle launch.

In this way, the method of FIG. 11 selects between operating the torque converter in a speed control mode or a torque control mode. Operating the torque converter impeller in speed control mode may increase torque converter and driveline efficiency. On the other hand, operating the torque converter impeller in a torque control mode while at the same time the torque converter lockup clutch is applied may improve vehicle acceleration and driveline efficiency.

Thus, the method of FIGS. 5-11 provide for a driveline operating method, comprising: accelerating a torque converter impeller to a desired speed responsive to release of a brake pedal during a vehicle launch; providing hydraulic and friction torque paths through a torque converter in response to driver demand less than a threshold during the vehicle launch; and providing only a hydraulic torque path through the torque converter in response to driver demand greater than the threshold during the vehicle launch. The method includes where the vehicle launch is a time from zero or creep vehicle speed before a tip-in to a time when a torque converter turbine speed is within a predetermined speed of torque converter impeller speed. The method includes where the friction torque path is provided via a torque converter lockup clutch, and where the vehicle launch is from zero speed or creep speed. The method also includes where the hydraulic torque path is from a torque converter impeller to a torque converter turbine via transmission fluid.

In some examples, the method further comprises determining a virtual torque converter impeller speed that is not equivalent to an actual torque converter impeller speed when providing the hydraulic and friction torque paths. The method includes where the virtual torque converter impeller speed is based on a driver demand torque. The method includes where the virtual torque converter impeller speed is determined for a time in the future.

The method of FIGS. 5-11 also provide for a driveline operating method, comprising: accelerating a torque converter impeller to a desired speed in response to a brake pedal release during a vehicle launch from zero speed or creep speed; maintaining a torque converter impeller speed at the desired speed until an increase in driver demand torque; entering a torque converter impeller torque control mode during a torque converter lockup clutch delay period while providing hydraulic and friction torque paths through a torque converter in response to driver demand less than a threshold during the vehicle launch; and entering a torque converter impeller speed control mode in response to the torque converter lockup clutch delay period elapsing.

In some examples, the method further comprises entering the torque converter impeller torque control mode in response to the torque converter impeller speed being within a threshold speed of a torque converter turbine speed. The method includes where the desired speed is a speed greater than a base engine idle speed. The method includes where in the desired speed is a minimum transmission pump speed to provide a desired transmission fluid pressure. The method includes where the torque converter lockup clutch delay period is from a time when a torque converter lockup clutch is commanded to a time when the torque converter lockup clutch is at the commanded force or position. The method further comprises fully locking a torque converter lockup clutch in response to the torque converter impeller speed being within a threshold speed of a torque converter turbine speed. The method further comprises determining a virtual torque converter impeller speed via a controller while providing hydraulic and friction torque paths through the torque converter. The method further comprises adjusting the torque converter lockup clutch in response to a virtual torque converter impeller speed that is different than an actual torque converter impeller speed.

Figure 12:
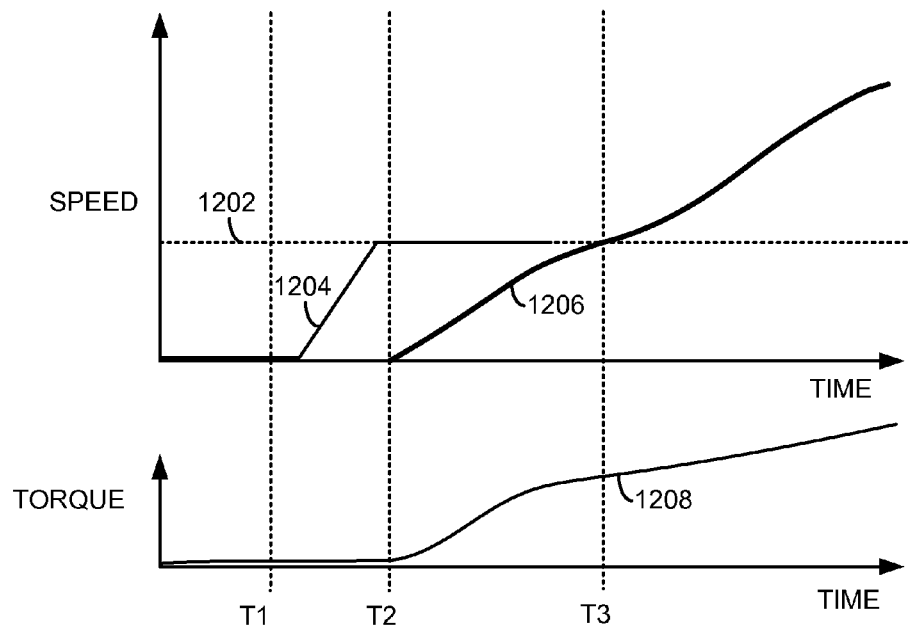
FIGS. 12-15 show example vehicle launch sequences during different conditions.

Referring now to FIG. 12, plots of torque converter impeller speed and torque converter turbine speed during vehicle launch is shown. For the first plot at the top of FIG. 12, the horizontal axis represents time and time increases from the left to right side of the figure. The vertical axis represents speed and speed increases in the direction of the vertical axis arrow. Horizontal line 1202 represents a desired torque converter impeller speed. Line 1204 represents torque converter impeller speed. Line 1206 represents torque converter turbine speed. For the second plot from the top of FIG. 12, the horizontal axis represents time and the vertical axis represents torque converter clutch torque transfer capacity. Line 1208 represents torque converter lockup clutch torque transfer capacity. The time scales of the first plot and the second plot represent the same time, and the vertical lines T1-T3 represent time of interest in the launch sequence.

Before time T1 the torque converter impeller speed and torque converter turbine speed are zero indicating that the engine and motor are stopped. Further, the vehicle is stopped and the torque converter lockup clutch is open as is indicated by the lockup clutch torque transfer capacity being low. At time T1, the driver releases a vehicle brake pedal (not shown) in preparation for vehicle launch. Shortly thereafter, the torque converter impeller speed is accelerated to the level of line 1202 while the torque converter lockup clutch remains open. In this example, the torque converter turbine does not rotate when torque converter impeller reaches the amount or level of line 1202, but in other examples the torque converter turbine may rotate before the driver tips-in.

At time T2, the driver applies the accelerator pedal (not shown) to launch the vehicle. The torque converter impeller speed is maintained constant at the level of line 1202 and the torque converter turbine speed begins to increase as the torque converter lockup clutch begins to close in response to the tip-in. The torque converter lockup clutch begins to transfer torque from the torque converter impeller to the torque converter turbine and force is applied to close the torque converter lockup clutch. The torque converter impeller speed remains unchanged since the motor and/or engine are in speed control mode. The motor and/or engine torque output may increase to maintain the torque converter impeller at a constant speed since the torque converter lockup clutch is transferring torque from the torque converter impeller to the torque converter turbine.

At time T3, the torque converter turbine speed reaches the torque converter impeller speed. The torque converter impeller and motor and/or engine exit speed control mode and enter torque control mode where driver demand torque is the basis for adjusting torque converter impeller torque. Further, the torque converter lockup clutch torque transfer capacity is increased to fully lock the torque converter lockup clutch, thereby increasing torque converter efficiency.

In this way, torque converter impeller speed may be maintained during launch to improve torque converter efficiency. Further, torque converter impeller speed control mode may be exited in response to torque converter turbine speed being within a threshold speed of torque converter impeller speed.

Figure 13:
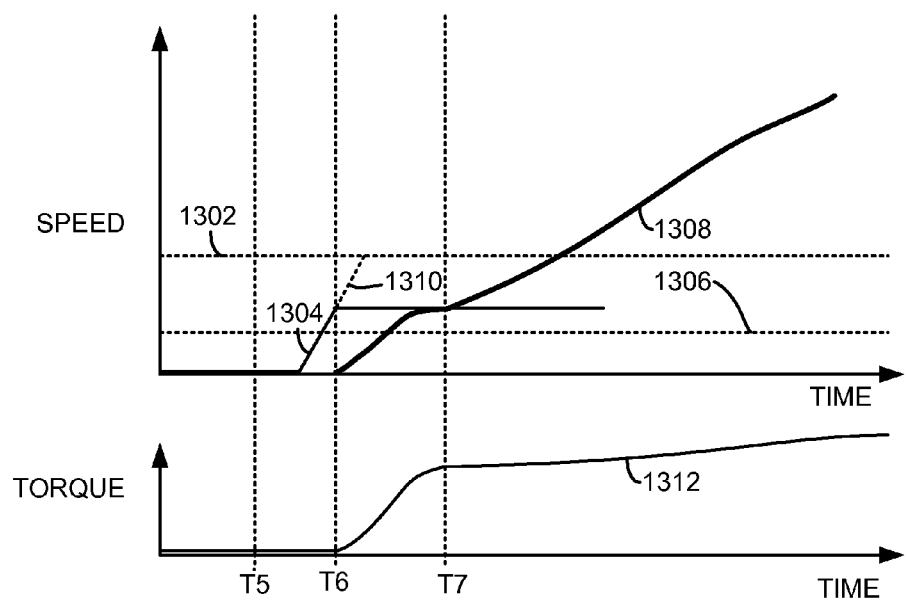

Referring now to FIG. 13, plots of torque converter impeller speed and torque converter turbine speed during vehicle launch is shown. For the first plot at the top of FIG. 13, the horizontal axis represents time and time increases from the left to right side of the figure. The vertical axis represents speed and speed increases in the direction of the vertical axis arrow. Dashed horizontal line 1302 represents an initial desired torque converter impeller speed, in this example a speed elevated from a base engine idle speed. Solid line 1304 represents actual torque converter impeller speed. Line 1308 represents torque converter turbine speed. Line 1306 represents a minimum speed torque converter impeller speed where a transmission fluid pump supplies transmission fluid at a desired pressure. Line 1310 represents torque converter impeller speed trajectory if a tip-in is not provided before torque converter impeller speed reaches the initial desired torque converter impeller speed. The torque converter impeller speed represented by line 1310 is equivalent to torque converter impeller speed represented by line 1304 until a tip-in occurs at time T6. For the second plot from the top of FIG. 13, the horizontal axis represents time and the vertical axis represents torque converter clutch torque transfer capacity. Line 1312 represents torque converter lockup clutch transferred torque. The time scales of the first plot and the second plot represent the same time, and the vertical lines T5-T7 represent time of interest in the launch sequence.

Before time T5 the torque converter impeller speed and torque converter turbine speed are zero indicating that the engine and motor are stopped. Further, the vehicle is stopped and the torque converter lockup clutch is open as is indicated by the lockup clutch application torque transfer capacity being low. At time T5, the driver releases a vehicle brake pedal (not shown) in preparation for vehicle launch. Shortly thereafter, the torque converter impeller speed is accelerated above the level of line 1306 so that a minimum transmission output pressure is provided by the torque converter impeller spinning the transmission fluid pump. The torque converter lockup clutch remains open. In this example, the torque converter turbine does not rotate when torque converter impeller reaches the amount or level of line 1306, but in other examples the torque converter turbine may rotate before the driver tips-in.

At time T6, the driver applies the accelerator pedal (not shown) to launch the vehicle. The desired torque converter impeller speed becomes the torque converter impeller speed at the time the driver tips-in instead of the initial desired torque converter impeller speed 1302 so that torque transfer through the torque converter may be smooth. However, if the actual torque converter impeller speed were less than the minimum pump speed for the transmission pump to output a desired pressure, the desired torque converter speed would be adjusted to the minimum pump speed. The torque converter turbine speed begins to increase as the torque converter lockup clutch begins to close in response to the tip-in. The torque converter lockup clutch begins to transfer torque from the torque converter impeller to the torque converter turbine and force is applied to close the torque converter lockup clutch. The torque converter impeller speed remains unchanged after the tip-in since the motor and/or engine are in speed control mode. The motor and/or engine torque output may increase to maintain the torque converter impeller at a constant speed since the torque converter lockup clutch is transferring torque from the torque converter impeller to the torque converter turbine.

At time T7, the torque converter turbine speed reaches the torque converter impeller speed. The torque converter impeller and motor and/or engine exit speed control mode and enter torque control mode where driver demand torque is the basis for adjusting torque converter impeller torque. Further, the torque converter lockup clutch torque transfer capacity is increased to fully lock the torque converter lockup clutch, thereby increasing torque converter efficiency.

In this way, torque converter impeller speed may be maintained at one of several different levels in response to vehicle operating conditions during launch to improve torque converter efficiency. Further, torque converter impeller speed control mode may be exited and a torque converter impeller torque control mode entered in response to torque converter turbine speed being within a threshold speed of torque converter impeller speed.

Referring now to FIG. 14, plots of torque converter impeller speed and torque converter turbine speed during vehicle launch is shown. For the first plot at the top of FIG. 14, the horizontal axis represents time and time increases from the left to right side of the figure. The vertical axis represents speed and speed increases in the direction of the vertical axis arrow. Line 1402 represents a baseline engine idle speed and line 1404 represents a minimum transmission pump speed to provide a desired transmission fluid pressure. Dashed line 1406 represents torque converter impeller speed. Solid line 1408 represents torque converter turbine speed. For the second plot from the top of FIG. 14, the horizontal axis represents time and the vertical axis represents torque converter clutch torque transfer capacity or torque converter slip speed. Dashed line 1412 represents torque converter lockup clutch torque transfer capacity, and solid line 1410 represents torque converter slip speed. The time scales of the first plot and the second plot represent the same time, and the vertical lines T10-T13 represent time of interest in the launch sequence.

Before time T10 the torque converter impeller speed and torque converter turbine speed are zero indicating that the engine and motor are stopped. Further, the vehicle is stopped and the torque converter lockup clutch is open as is indicated by the lockup clutch application torque transfer capacity being low. At time T10, the driver releases a vehicle brake pedal (not shown) in preparation for vehicle launch. Shortly thereafter, the torque converter impeller speed is accelerated while the torque converter impeller and motor and/or engine are in a speed control mode in response to vehicle operating conditions while the torque converter lockup clutch remains open. In this example, the torque converter turbine does not rotate when torque converter impeller accelerates, but in other examples the torque converter turbine may rotate before the driver tips-in.

At time T11, the driver applies the accelerator pedal (not shown) to launch the vehicle. The torque converter impeller speed is slowly ramped to increase the torque transferred from the torque converter impeller to the torque converter turbine in response to the tip-in. The torque converter lockup clutch also begins to close but no torque is transferred since the torque converter lockup torque capacity is low. Thus, torque transfer via the torque converter lockup clutch response is delayed. The increase in torque converter impeller speed also provides compensation for the delay of torque transfer via the torque converter lockup clutch by temporarily increasing torque transfer through the torque converter hydraulic torque path.

At time T12, the torque converter lockup clutch torque transfer delay has ended and the torque converter turbine begins to accelerate by torque provided through the torque converter friction path (e.g., the torque converter lockup clutch). The torque converter impeller speed continues to ramp up and the ramp rate may be proportional to the driver demand torque or accelerator pedal position.

At time T13, the torque converter turbine speed reaches the torque converter impeller speed. The torque converter impeller and motor and/or engine exit speed control mode and enter torque control mode where driver demand torque is the basis for adjusting torque converter impeller torque. Further, the torque converter lockup clutch torque transfer capacity is increased to fully lock the torque converter lockup clutch, thereby increasing torque converter efficiency.

In this way, torque converter impeller speed may be ramped in response to increased driver demand torque so as to increase torque transferred via a hydraulic torque path at least until the torque converter lockup clutch delay (e.g., a time from commanding the lockup clutch to when the lockup clutch reaches the commanded position) is over. Further, torque converter impeller speed control mode may be exited and a torque converter impeller torque control mode entered in response to torque converter turbine speed being within a threshold speed of torque converter impeller speed.

Figure 15:
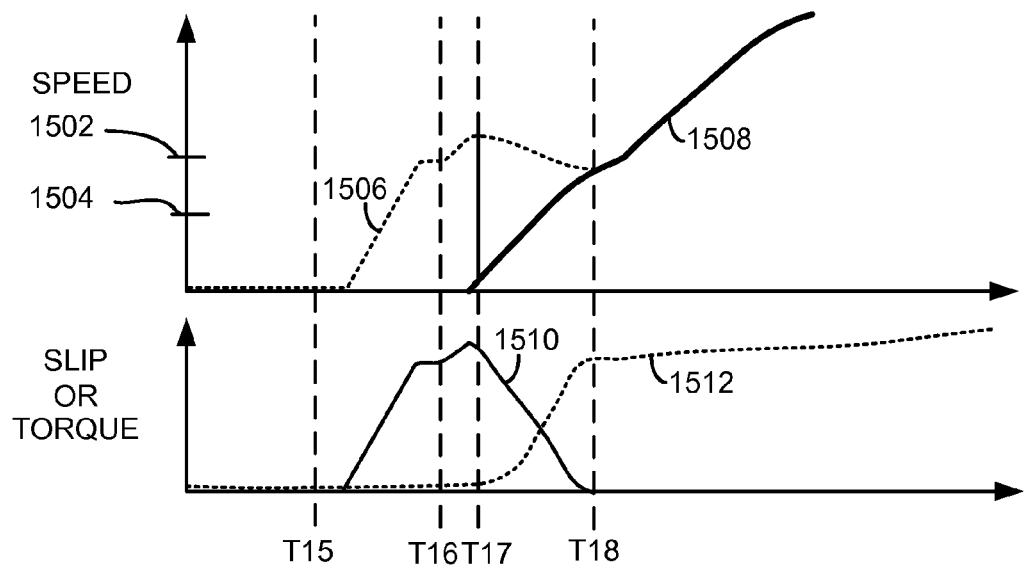

Referring now to FIG. 15, plots of torque converter impeller speed and torque converter turbine speed during vehicle launch is shown. For the first plot at the top of FIG. 15, the horizontal axis represents time and time increases from the left to right side of the figure. The vertical axis represents speed and speed increases in the direction of the vertical axis arrow. Line 1502 represents a baseline engine idle speed and line 1504 represents a minimum transmission pump speed to provide a desired transmission fluid pressure. Dashed line 1506 represents torque converter impeller speed. Solid line 1508 represents torque converter turbine speed. For the second plot from the top of FIG. 15, the horizontal axis represents time and the vertical axis represents torque converter clutch torque transfer capacity or torque converter slip speed. Dashed line 1512 represents torque converter lockup clutch torque transfer capacity, and solid line 1510 represents torque converter slip speed. The time scales of the first plot and the second plot represent the same time, and the vertical lines T15-T18 represent time of interest in the launch sequence.

Before time T15 the torque converter impeller speed and torque converter turbine speed are zero indicating that the engine and motor are stopped. Further, the vehicle is stopped and the torque converter lockup clutch is open as is indicated by the lockup clutch application torque transfer capacity being low. At time T15, the driver releases a vehicle brake pedal (not shown) in preparation for vehicle launch. Shortly thereafter, the torque converter impeller speed is accelerated while the torque converter impeller and motor and/or engine are in a speed control mode in response to vehicle operating conditions while the torque converter lockup clutch remains open. In this example, the torque converter turbine does not rotate when torque converter impeller accelerates, but in other examples the torque converter turbine may rotate before the driver tips-in.

At time T16, the driver applies the accelerator pedal (not shown) to launch the vehicle. The torque converter impeller and motor and/or engine are transitioned into a torque control mode where torque converter impeller torque is based on driver demand torque. The torque converter impeller speed is allowed to accelerate, thereby increasing torque through the hydraulic torque path of the torque converter. The torque converter lockup clutch also begins to close but torque is not transferred from the torque converter impeller to the torque converter turbine since the torque converter lockup clutch does not close immediately. Thus, torque transfer via the torque converter lockup clutch is delayed. The increase in torque converter impeller torque provides compensation for delay of torque transfer via the torque converter lockup clutch by temporarily increasing torque transfer through the torque converter hydraulic torque path.

At time T17, the torque converter lockup clutch torque transfer delay has ended and the torque converter turbine begins to accelerate by torque provided through the torque converter friction path (e.g., the torque converter lockup clutch). The torque converter impeller and motor and/or engine transition from torque control mode to speed control mode. Another option is to place motor/engine in torque control mode and let the converter clutch control the desired impeller speed or slip as described by FIG. 10. The torque converter impeller speed is reduced to reduce the amount of slip and torque transfer though the torque converter hydraulic torque path.

At time T18, the torque converter turbine speed reaches the torque converter impeller speed. The torque converter impeller and motor and/or engine exit speed control mode and enter torque control mode where driver demand torque is the basis for adjusting torque converter impeller torque. Further, the torque converter lockup clutch torque transfer capacity is increased to fully lock the torque converter lockup clutch, thereby increasing torque converter efficiency.

In this way, torque converter impeller speed may be transitioned between torque and speed control modes to provide increased wheel torque and improved torque converter efficiency. Further, torque converter impeller speed control mode may be exited and a torque converter impeller torque control mode entered in response to torque converter turbine speed being within a threshold speed of torque converter impeller speed.

Note that the example control and estimation routines included herein can be used with various engine and/or vehicle system configurations. Further, the methods described herein may be a combination of actions taken by a controller in the physical world and instructions within the controller. At least portions of control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
accelerating a torque converter impeller from zero speed toward a desired speed responsive to release of a brake pedal during a vehicle launch, where the vehicle launch is a time from zero or creep vehicle speed before a tip-in to a time when a torque converter turbine speed is within a predetermined speed of torque converter impeller speed;
maintaining the torque converter impeller at the desired speed until the tip-in via operating an engine or a motor in a speed control mode;
providing hydraulic and friction torque paths through a torque converter in response to driver demand less than a threshold during the vehicle launch;
providing only the hydraulic torque path through the torque converter in response to driver demand greater than the threshold during the vehicle launch;
adjusting the desired speed to a speed of the torque converter impeller at a time of the tip-in when the torque converter impeller has not reached the desired speed; and
adjusting the desired speed to a pump speed where a transmission fluid pump supplies transmission fluid at a minimum pressure to operate transmission clutches when the speed of the torque converter impeller at the time of the tip-in is less than a threshold speed.

2. The method of claim 1, where the friction torque path is provided via a torque converter lockup clutch and further comprising:
maintaining the torque converter impeller at the desired speed after the tip-in via operating the engine or the motor in the speed control mode.

3. The method of claim 2, where the hydraulic torque path is from the torque converter impeller to a torque converter turbine, and further comprising:
operating the engine or the motor in a torque control mode in response to the torque converter turbine speed being equal to the torque converter impeller speed.

4. The method of claim 1, further comprising determining a virtual torque converter impeller speed that is not equivalent to an actual torque converter impeller speed when providing the hydraulic and friction torque paths.

5. The method of claim 4, where the virtual torque converter impeller speed is based on a driver demand torque and torque converter impeller inertia.

6. The method of claim 5, where the virtual torque converter impeller speed is determined for one sample event in the future.

7. A driveline operating method, comprising:
accelerating a torque converter impeller from zero speed toward a desired speed responsive to release of a brake pedal during a vehicle launch;
maintaining the torque converter impeller at the desired speed until a tip-in via operating an engine or a motor in a speed control mode;
providing hydraulic and friction torque paths through a torque converter in response to driver demand less than a threshold during the vehicle launch, where the friction torque path is provided via a torque converter lockup clutch, where the hydraulic torque path is from the torque converter impeller to a torque converter turbine, and where the vehicle launch is from zero speed or creep speed;
providing only a hydraulic torque path through the torque converter in response to driver demand greater than the threshold during the vehicle launch;
maintaining the torque converter impeller at the desired speed after the tip-in via operating the engine or the motor in the speed control mode; and
operating the engine or the motor in a torque control mode in response to torque converter turbine speed being equal to torque converter impeller speed.

* * * * *